United States Patent [19]

Hanson et al.

[11] 4,042,750
[45] Aug. 16, 1977

[54] PRODUCTS AND PROCESS FOR PREPARATION OF POLYAMIDES AND SHAPED ARTICLES THEREFROM

[75] Inventors: Robert B. Hanson, Aurora; James R. Stephens, Naperville, both of Ill.

[73] Assignee: Standard Oil Company (Indiana), Chicago, Ill.

[21] Appl. No.: 581,818

[22] Filed: May 29, 1975

Related U.S. Application Data

[63] Continuation-in-part of Ser. No. 348,869, April 9, 1973, Pat. No. 3,959,233.

[51] Int. Cl.² .................... B32B 15/02; B32B 15/08; B32B 27/34
[52] U.S. Cl. .................... 428/423; 260/77.5 C; 260/77.5 R; 428/424; 428/458; 428/474
[58] Field of Search .................. 260/77.5 CH, 77.5 C, 260/77.5 R; 428/474–476, 479, 458, 423, 424

[56] References Cited

U.S. PATENT DOCUMENTS

| 2,333,914 | 11/1943 | Berchet | 260/77.5 CH |
| 2,364,204 | 12/1944 | Fuller | 428/474 X |
| 3,284,416 | 11/1966 | Kamal | 260/77.5 CH |
| 3,523,925 | 8/1970 | Kamal et al. | 260/77.5 CH |
| 3,578,639 | 5/1971 | Sheffer | 260/77.5 CH |
| 3,916,074 | 11/1975 | Knackstedt | 428/474 X |
| 3,922,447 | 11/1975 | Isaksen et al. | 428/474 |

Primary Examiner—Harold Ansher
Attorney, Agent, or Firm—Geoffrey M. Novelli; Arthur G. Gilkes; William T. McClain

[57] ABSTRACT

Polyamides are prepared by reacting aromatic diacid with aromatic or aliphatic diamine in the molar ratio of about 1:0.5 to about 1:0.9 and then reacting this product with at least 0.1 to about 0.5 up to about 0.75 moles of an aromatic or an aliphatic diisocyanate. The products are useful as wire enamels, coatings, and molding resins as well as films, fibers, adhesives, and impregnating materials.

26 Claims, No Drawings

PRODUCTS AND PROCESS FOR PREPARATION OF POLYAMIDES AND SHAPED ARTICLES THEREFROM

This is a continuation-in-part of Ser. No. 348,869, filed Apr. 9, 1973, now U.S. Pat. No. 3,959,233 in the names of Robert B. Hanson and James R. Stephens and assigned to Standard Oil Company (Indiana). Priority is claimed for this application as to all subject matter disclosed in the aforementioned parent application.

This invention relates to high molecular weight polyamides derived from aromatic diacids, aromatic and aliphatic diamines, and diisocyanates. The aromatic diacids have the formula

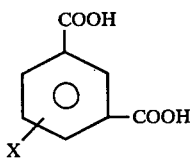

where X is hydrogen, nitro, or a radical having six or less carbons. In the reaction scheme, an excess of aromatic diacid and the diamine react to form a polyamide prepolymer. This low molecular weight species having carboxylic acid end groups, produced by reaction imbalance, is then reacted with the diisocyanate to produce high molecular weight polyamides.

Advantageously in this novel reaction imbalance process care is taken to keep the molar ratio of aromatic diacid to diamine between 1:0.7 to about 1:0.9 and bout 0.3 to about 0.1 mole of diisocyanate per mole of diacid, respectively. In the preferred embodiment, 1 mole of aromatic diacid is reacted with 0.8 mole of diamine and this prepolymer is reacted with at least 0.2 mole of diisocyanate. Generally, 1 mole of aromatic diacid is reacted with between 0.5 and about 0.9 mole of diamine and this product is reacted with at least 0.5 (up to about 0.75 mole) to 0.1 mole of diisocyanate, respectively.

Useful aromatic diacids are isophthalic acid and its 2,4,5, or 6 position halogenated and/or nitrated derivative such as 5-nitroisophthalic acid; similarly halogenated an unhalogenated isophthalic acid derivatives having an alkyl or an alkenyl radical of six or less carbons in the 4 or 5 position, such as 5-methylisophthalic acid, 4-vinylisophthalic acid, and 5-tert-butylisophthalic acid among others; and mixtures thereof. Preferably the aromatic diacids have the formula

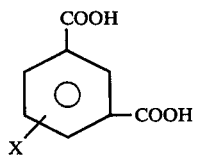

where X is hydrogen or a radical having about six or less carbon atoms. Up to about 40 mole percent of the above aromatic diacids can be replaced by terephthalic acid or its alkylated or halogenated derivatives; by any of the position isomers of naphthalene dicarboxylic acid such a 2,6-napathalene dicarboxylic acid among others, and their alkylated or halogenated derivatives; and by mixtures thereof.

The reaction between aromatic diacid and diamine is carried out at a temperature of about 210° to about 250° C, preferably at about 220°–230° C when atmospheric pressure is used. To this product is added the diisocyanate at a temperature ranging between room temperature and 125° C. Suitably, the reaction temperature may be 120° to 155° C and preferably this final reaction is initiated at room temperature and completed at about 135° C.

Nitrogen or sulfoxide containing organic polar solvents or substituted phenols are advantageously employed in preparing the polyamide prepolymers. Useful solvents include the following: N-methylpyrrolidone, cresylic acid, p-cresol, m-cresol, dimethyl sulfoxide, N-methyl caprolactam, dimethylsulfone, and phenol. The preferred solvent is N-methylpyrrolidone.

At the completion of the prepolymer forming step, diluents may be added. Representative diluents include N-methylpyrrolidone, dimethylacetamide (DMAC), dimethylformamide, or mixtures of the above with aromatic hydrocarbon streams (such as Solvesso 100 and 150), xylenes and toluene.

The diamines useful for the reaction may be aromatic or aliphatic. These diamines have the formula $H_2N-R'-NH_2$, $H_2N-R'-NH_2-$, $H_2N-R'-CH_2-R'-NH_2$,

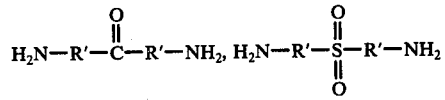

and $H_2N-R'-S-R'-NH_2$ wherein R' is a divalent aromatic or aliphatic hydrocarbon radical. The aromatic diamines have from one to about fur aromatic rings, advantageously from one to about two aromatic rings. The aromatic diamines having more than one aromatic ring may be further characterized as polycyclic aromatic compounds having two amino groups on an interconnected polycyclic aromatic nucleus. The aromatic rings may be interconnected by condensation, as in naphthalene or in phenanthrene-type structures, or may be bridged, either directly as in benzidine or indirectly as, for example, two R' groups are joined with stable inert linkages such as oxy, methylene, alkyl, alkenyl, carbonyl, sulfonyl and other relatively inactive groups such as sulfide groups as hereinbefore described. Suitable nuclei (R' divalent aromatic hydrocarbon radical) include phenyl, naphthyl, anthryl, naphthacenyl and the like; diphenyl, terphenyl, phenylnaphthyl, quaterphenyl and the like; and aromatic rings separated by oxy, sulfonyl and thio groups, and aliphatic groups containing from 1–12 carbon atoms. The aliphatic diamines, including alkylene diamines such as hexamethylene diamine, ethylene diamine, pentamethylene diamine and dodecamethylene diamine, are useful.

Useful aromatic diamines include methylenebis(aniline), (4,4'-diaminodiphenylmethane), oxy bis(aniline), (4,4'-diaminodiphenylether), benzidine, m-phenylenediamine, p-phenylenediamine, 2,4- and 2,6-toluenediamine (and mixtures of such), 3,3'-diaminodiphenyl, 1,4-diaminonaphthalene, 4,4'-diaminodiphenyl ketone, 4,4'-diaminodiphenyl sulfone, bis(4-aminophenyl)-1,1 ethane.

The corresponding secondary diamines of any of the above recited aromatic and aliphatic primary diamines, such as N,N'-dimethyl methylenebis(aniline) and N,N'-dimethylhexamethylene diamine among others, are similarly useful.

Useful aromatic diisocyanates include methylene bis (4-phenylisocyanate, oxybis(4-phenylisocyanate, 1,5- naphthalene diisocyanate, m-phenylene diisocyanate, mesitylene diisocyanate, durylene diisocyanate, toluene diisocyanate, 4,4'-bi-o-tolylene diisocyanate, 4,4'-methylene-di-o-tolyldiisocyanate, 4-methoxy-1,3-phenylene diisocyanate 4-isopropyl-1,3-phenylene diisocyanate, 4-chloro-1,3-phenylene diisocyanate, 3,3'-dimethyl4,4'-diisocyanatodiphenyl methane, 3,3'-bitolylene-4,4'-diisocyanate, 4,4'-diisocyanato diphenyl sulfone. Useful alkylene diisocyanates include hexamethylenediisocyanate, ethylene diisocyanate, dodecamethylene diisocyanate, and pentamethylene diisocyanate.

The polyamide is employed as wire enamel while in solution in a solvent system such as those specified above. It is applied to an electrical conductor, e.g., copper, silver, aluminum or stainless steel wire in conventional fashion, e.g., by the "free dip" method or the "die application" procedure, both of which procedures are described in Meyer U.S. Pat. No. 3,201,276. Wire speeds of 15–40 feet per minute can be used with wire tower temperatures of 400° to 900° F, usually with a final temperature above 500° F. The build-up of the polyamide enamel on the wire can be 0.0013 to 0.0049 inch, preferably 0.0026 to 0.0034 inch using AWG No. 18 wire. The wire is passed through the enamel one or more times until the desired build-up is obtained. By build-up is meant the total increase in diameter over the bare wire diameter.

As noted above, the soluble polyamide can be converted to tough, solid resins. Advantageously, this is accomplished in the process of forming films, coatings, fibers, impregnated and molded articles. For example, a solution of the product, that is the polyamide, is applied to a wire, or other surface, and heated at a temperature of about 200° to about 420° C, usually about 300°–400° C (for wire coatings), for a time sufficient to evaporate solvents and form the solid polyamide.

In this manner, surfaces, sheets, etc., made out of metal like steel, copper, aluminum, nickel, etc., for example, or various alloys, can be coated. Similarly, laminated objects having a plurality of layers bonded together with the polyamide polymer can be made. Each layer is made up of a polyamide on the material to be laminated. The lamination is carried out by placing the object to be laminated (normally a glass cloth) in the polyamide of this invention dissolved in an organic solvent and then removing solvent at elevated temperatures. Multiple layers of the polyamide-impregnated sheets are then pressed and cured at elevated temperatures. Glass or asbestos fibers can be coated by depositing the polyamide in solution on said materials and then heat curing it.

The following examples illustrate some embodiments of this invention. It will be understood that they are for illustrative purposes only and do not purport to be wholly definitive as to conditions or scope.

EXAMPLE I

Into an appropriate vessel equipped with a stirrer, nitrogen purge, thermometer, and trap with condenser is placed 166.1 parts isophthalic acid, 119.0 parts methylenebis(aniline), 190.0 parts N-methylpyrrolidone, and 17.6 parts pseudocumene. The contents of the flask were brought to 220° C over a 2.5 hour period. Some aqueous material was withdrawn from the trap during this period. After a 4 hour hold at 220° C, 820 parts of N-methylpyrrolidone were added over a 20 min. period. When the temperature had fallen to 135° C, 100 parts Isonate 125 MF (doubly distilled methylene-di-p-phenyldiisocyanate were added and heating continued for 1 hour. An additional 20 parts Isonate 125 MF were added over 1.5 hours yielding a solution having a Gardner-Holdt viscosity of Z6(+) at 26.5% solids. The product was removed from solution by precipitation (in water) in a Waring Blendor. The polymer was filtered and dryed. A sample of the polymer was compression molded at 550° F:

| TIME (Min.) | PRESSURE (Tons) |
| --- | --- |
| 45 | Contact |
| 2 | 2.5 |
| 2 | 5 |
| 1.0 | 10 |
| 4 | 25 |
| 1.0 | 50 |
| 5 | 25 |

The mold was cooled to 450° F and the specimen ejected. The tensile strength was 12,186 psi at an elongation at break of 5.3%.

EXAMPLE II

Into an appropriate vessel equipped with a stirrer, nitrogen purge, thermometer, and trap with condenser is placed 222.2 parts of 5-tert-butylisophthalic acid, 104.6 parts hexamethylene diamine, 100 parts N-methylpyrrolidone, and 17.6 parts pseudocumene. The contents of the flask were brought to 220° C over a period of 2.5 hours and held at 220°–225° C for a length of 5 hours. Some aqueous material was drained from the trap during this period. Heat was removed and 880 parts N-methylpyrrolidone added over a 20 min. period. The system was allowed to cool to 25° C. Isonate 125 MF (30 parts) was added and the mixture brought to 135° C over 1 hour. An additional 18 parts Isonate 125 MF were added over a 2 hour period yielding a product having a Brookfield viscosity of 232 poises at 26.2% solids. The product was precipitated into water in a Waring Blendor, filtered and dried. A sample was molded at 340° F according to the schedule shown in Example I. The tensile strength was 14,248 psi at an elongation at break of 9.5%.

EXAMPLE III

An appropriate vessel equipped with a stirrer, nitrogen purge, thermometer, and trap with condenser is charged with 277.8 parts of 5-tert-butylisophthalic acid, 198.3 parts of methylenebis(aniline), 162 parts N-methylpyrrolidone, and 30 parts pseudocumene. The reaction mixture is heated to 220° C over a period of 2 hours and held at 220°–225° C for 5 hours. Some water is occasionally drained from the trap. Heat is removed and 938 parts N-methylpyrrolidone added. The solution is allowed to cool to 25° C. Seventy parts methylene-di-p-phenyldiisocyanate (Isonate 125M) are added and the mixture brought to 135 ° C over 2 hours. After 2 hours at 135° C the Gardner-Holdt viscosity is W. An additonal 27 parts of Isonate 125M added over 3 hours gave a Gardner-Holdt of Z5(+). Dilution with 500 parts xylene gave a solution having a Brookfield viscosity of 14 poise at 27.5% solids. A sample of the solution was coated on 18 AWG copper wire as a total insulation system.

EXAMPLE IV

A three liter roundbottom flask equipped as in Example I was charged with 200 parts 5-tert-butylisophthalic acid, 16.6 parts terephthalic acid, 158.6 parts methylenebis(aniline), 130 parts N-methylpyrrolidone, and 30 parts pseudocumene. Heat was applied and the reaction mixture brought to 220° C over 2.5 hours. After a 5-hour hold at 220°-225° C (some lower layer drained from trap during this period), 750 parts N-methyl-pyrrolidone were added and the solution allowed to cool. At 25° C 65 parts Isonate 125 M were added and the mixture brought to 135° C over 2 hours. After 1 hour at 135° C the Gardner-Holdt viscosity was Y-Z. An additional 14 parts of 125M were added over 1 hour 15 minutes giving a viscosity of Z 6(+). Heat was removed and 400 parts xylene added. The solution was cooled to 25° C.

| Properties: | Brookfield | - 22 Poise |
|---|---|---|
| | Solids | - 26.9% |
| | $\eta$inh | - 0.52 |
| | Acid titer | - 0.04 |
| | Film | - flexible (marginal strength) |

EXAMPLE V

A three liter roundbottom flask equipped as in Example I was charged with 200° parts 5-tert-butylisophthalic acid, 21.6 parts 2,6-naphthalene dicarboxylic acid, 158.6 parts methylenebis(aniline), 130 parts N-methylpyrrolidone, and 30 parts pseudocumene. Heat was applied and the mixture brought to 220° C over 2 hours. After a 5-hour hold at 220° C (+) (some aqueous lower layer drained from trap during this period), heat was removed and 825 parts N-methylpyrrolidone were added. The solution was allowed to cool. At 25° C 65 parts Isonate 125M were added and the solution brought to 135° C over 2 hours. After 1 hour at 135° C the Gardner-Holdt viscosity was X. An additional 12 parts Isonate 125M added over 135 minutes gave a final viscosity of Z7(−). Heat was removed and 400 parts N-methylpyrrolidone were added and the solution cooled to 25° C. The Brookfield viscosity was 29 poise at 26.7% solids. The inherent viscosity was 0.52 dl/g (DMAC, 0.5%) an cast films cured at 600° F (5 minutes) could be creased 180°.

We claim:

1. High molecular weight polyamide polymers having film-forming properties comprising the reaction product of an aromatic diacid of the formula

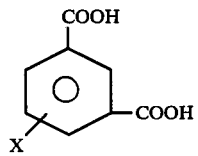

where X is hydrogen, nitro, or an alkyl or alkenyl radical having about 6 or less carbon atoms, with a diamine in a mole ratio of about 1:0.5 to about 1:0.9 at a temperature of about 210° to about 250° C., to give a low molecular weight polymer having an excess of carboxylic acid moieties and then further condensing this polymer with about 0.1 up to about 0.75 moles of a diisocyanate for each diacid moiety in an inert solvent at a temperature of about 25° C. to about 150° C.

2. The product of claim 1 wherein up to about 40 mole per cent of the above aromatic diacids is replaced by terephthalic acid.

3. The product of claim 1 wherein up to about 40 mole percent of the above aromatic diacids is replaced by any of the position isomers of naphthalene dicarboxylic acid.

4. The product of claim 1 wherein up to about 40 mole per cent of the above aromatic diacids is replaced by 2,6-naphthalene dicarboxylic acid.

5. The product of claim 1 wherein the molar ratio of aromatic diacid to diamine is about 1:0.7 to about 1:09 and the mole ratio of the diacid to the diisocyanate is about 1:03 to about 1:0.1.

6. The product of claim 1 wherein the condensation of aromatic diacid with diamine is carried out at a temperature of about 220° to about 230° C. and the further condensation is carried out at about 130° to about 140° C.

7. The product of claim 1 wherein the aromatic diacid is isophthalic acid.

8. The product of claim 1 wherein the aromatic diacid is tertbutylisophthalic acid.

9. The product of claim 1 wherein the diamine is hexamethylene diamine.

10. The product of claim 1 wherein the diamine is methylenebis aniline.

11. The product of claim 1 wherein the diisocyanate is methylene di-p-phenyldiisocyanate.

12. A process for preparing high moluecular weight polyamide polymers having film forming properties which process comprises condensing an aromatic diacid of the formula

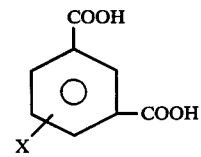

where X is hydrogen, nitro, or an alkyl or alkenyl radical having about six or less carbon atoms, with a diamine in a mole ratio of about 1:0.5 to about 1:0.9 at a temperature of about 210° to about 250° C., to give a low molecular weight polymer having an excess of carboxylic acid moieties and then further condensing this polymer with about 0.1 up to about 0.75 moles of diisocyanate for each diacid moiety in an inert solvent at a temperature of about 25° to about 150° C.

13. The process of claiim 12 wherein the molar ratio of the aromatic diacid to the diamine is about 1 to 0.7 to about 1 to 0.9 and the mole ratio of the diacid to the diisocyanate is about 1 to 0.3 to about 1 to 0.1

14. The process of claim 12 wherein the condensation of aromatic diacid with diamine is carried out at a temperature of about 220° to about 230° C and the further condensation is carried out at about 130° to about 140° C.

15. The process of claim 12 wherein the aromatic diacid is isophthalic acid.

16. The process of claim 12 wherein the aromatic diacid is tertbutylisophthalic acid.

17. The process of claim 12 wherein the diamine is hexamethylene diamine.

18. A process according to claim 12 wherein the diamine is methylenebisaniline.

19. A process according to claim 12 wherein the diisocyanate is methylene-di-p-phenyldiisocyanate.

20. An electrical conductor having a continuous coating of the polyamide prepared according to the process of claim 12.

21. A film of the polyamide prepared according to the process of claim 12.

22. A protective coating prepared according to the process of claim 12.

23. A fiber prepared from the polyamide prepared according to the process of claim 12.

24. An adhesive of the polyamide prepared according to the process of claim 12.

25. A laminate having a plurality of layers bonded together with the polyamide prepared according to the process of claim 12.

26. A molded article prepared from the polyamide of claim 12.

* * * * *

UNITED STATES PATENT OFFICE
CERTIFICATE OF CORRECTION

Patent No. 4,042,750    Dated August 16, 1977

Inventor(s) ROBERT B. HANSON and JAMES R. STEPHENS

It is certified that error appears in the above-identified patent and that said Letters Patent are hereby corrected as shown below:

Column 2, line 21, "$H_2N-R'-NH_2-$," should be -- $H_2N-R'-O-R'-NH_2-$, --.

" 6, " 7, "1:09" should be -- 1:0.9 --;
" 6, " 9, "1:03" should be -- 1:0.3 --.

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*